US010901564B2

(12) United States Patent
Keefer (10) Patent No.: US 10,901,564 B2
(45) Date of Patent: Jan. 26, 2021

(54) ELECTRODE PATTERN FOR CAPACITIVE TOUCH SENSOR

(71) Applicant: 3M INNOVATIVE PROPERTIES COMPANY, St. Paul, MN (US)

(72) Inventor: Kenneth J. Keefer, Westford, MA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/471,082

(22) PCT Filed: Dec. 18, 2017

(86) PCT No.: PCT/IB2017/058076
§ 371 (c)(1),
(2) Date: Jun. 19, 2019

(87) PCT Pub. No.: WO2018/116136
PCT Pub. Date: Jun. 28, 2018

(65) Prior Publication Data
US 2019/0324597 A1   Oct. 24, 2019

Related U.S. Application Data

(60) Provisional application No. 62/436,734, filed on Dec. 20, 2016.

(51) Int. Cl.
*G06F 3/044* (2006.01)
(52) U.S. Cl.
CPC .................. *G06F 3/0443* (2019.05)
(58) Field of Classification Search
CPC .................................................. G06F 3/0443
See application file for complete search history.

(56) References Cited

U.S. PATENT DOCUMENTS 9,348,471 B2* 5/2016 Lee ...................... G06F 3/0443
10,025,435 B2* 7/2018 Chen ...................... G06F 3/041
(Continued)

FOREIGN PATENT DOCUMENTS

JP      2010250424    11/2010
KR      101474543     12/2014

OTHER PUBLICATIONS

International Search Report for PCT International Application No. PCT/IB2017/058076, dated Mar. 6, 2018, 5 pages.

*Primary Examiner* — Sejoon Ahn
(74) *Attorney, Agent, or Firm* — Jonathan L. Tolstedt (57) ABSTRACT

A capacitive touch sensitive apparatus comprises plurality of electrodes disposed within a touch sensitive viewing area. Spaced part electrically conductive first electrodes extend along a first direction and spaced apart electrically conductive second electrodes extend along a different second direction. Electrically isolated electrically conductive first polygonal islands are disposed between each pair of adjacent first electrodes and electrically isolated electrically conductive second polygonal islands are disposed between each pair of adjacent second electrodes. When viewed from a top plan view and except for a plurality of discrete spaced part open regions, the touch sensitive viewing area is covered by at least one of a first electrode, a second electrode, a first island, and a second island, each open region being at a vertex of at least one of the first and second polygonal islands.

10 Claims, 6 Drawing Sheets

(56) References Cited

U.S. PATENT DOCUMENTS

| | | | | |
|---|---|---|---|---|
| 10,255,873 B2* | 4/2019 | Liu | | G09G 5/003 |
| 10,416,822 B2* | 9/2019 | Seo | | G06F 3/044 |
| 10,613,652 B2* | 4/2020 | Jiang | | G02F 1/167 |
| 2002/0180712 A1* | 12/2002 | Sato | | G06F 3/041 |
| | | | | 345/173 |
| 2004/0027761 A1* | 2/2004 | Fukui | | G06F 3/041 |
| | | | | 361/100 |
| 2006/0097991 A1* | 5/2006 | Hotelling | | G06F 3/044 |
| | | | | 345/173 |
| 2007/0074913 A1* | 4/2007 | Geaghan | | G06F 3/044 |
| | | | | 178/18.06 |
| 2009/0219257 A1* | 9/2009 | Frey | | G06F 3/044 |
| | | | | 345/173 |
| 2010/0026664 A1* | 2/2010 | Geaghan | | G06F 3/044 |
| | | | | 345/174 |
| 2010/0156840 A1* | 6/2010 | Frey | | G01R 27/2605 |
| | | | | 345/174 |
| 2011/0001706 A1* | 1/2011 | Sanford | | G06F 3/0412 |
| | | | | 345/173 |
| 2011/0080376 A1* | 4/2011 | Kuo | | G06F 3/0412 |
| | | | | 345/177 |
| 2011/0100727 A1* | 5/2011 | Choi | | G06F 3/0418 |
| | | | | 178/18.01 |
| 2012/0017433 A1* | 1/2012 | Chung | | G06F 3/044 |
| | | | | 29/829 |
| 2012/0044212 A1* | 2/2012 | Mizutani | | G06F 3/0421 |
| | | | | 345/175 |
| 2013/0154954 A1 | 6/2013 | Chang | | |
| 2014/0002757 A1* | 1/2014 | Nagami | | G02F 1/13338 |
| | | | | 349/12 |
| 2014/0055380 A1* | 2/2014 | Han | | G06F 3/041 |
| | | | | 345/173 |
| 2014/0218325 A1* | 8/2014 | Iwami | | B32B 7/02 |
| | | | | 345/173 |
| 2015/0162252 A1* | 6/2015 | Klowak | | H01L 22/32 |
| | | | | 257/48 |
| 2015/0212609 A1* | 7/2015 | Tung | | B05D 1/36 |
| | | | | 345/174 |
| 2015/0317010 A1 | 11/2015 | Yashiro | | |
| 2016/0018929 A1 | 1/2016 | Kida | | |
| 2016/0306464 A1* | 10/2016 | Lee | | G06F 3/044 |
| 2017/0228070 A1* | 8/2017 | Roberts | | G06F 3/0448 |
| 2017/0309364 A1* | 10/2017 | Yamada | | G02B 1/118 |
| 2018/0032172 A1* | 2/2018 | Liu | | G02F 1/13338 |

* cited by examiner

ELECTRODE PATTERN FOR CAPACITIVE TOUCH SENSOR

TECHNICAL FIELD

This disclosure relates generally to touch sensitive devices, and to processes and systems related to such devices.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

BRIEF SUMMARY

Some embodiments involve a capacitive touch sensitive apparatus comprising a touch sensitive viewing area. A plurality of electrodes is disposed within the touch sensitive viewing area. A plurality of spaced apart electrically conductive first electrodes are disposed in the touch sensitive viewing area and extend along a first direction. A plurality of spaced apart electrically conductive second electrodes are disposed in the touch sensitive viewing area and extend along a different second direction. A plurality of electrically isolated electrically conductive first polygonal islands are disposed between each pair of adjacent first electrodes. A plurality of electrically isolated electrically conductive second polygonal islands are disposed between each pair of adjacent second electrodes. When viewed from a top plan view and except for a plurality of discrete spaced part open regions, the touch sensitive viewing area is covered by at least one of a first electrode, a second electrode, a first island, and a second island, each open region being at a vertex of at least one of the first and second polygonal islands.

Some embodiments are directed to a capacitive touch sensitive apparatus. An upper electrode layer of the touch sensitive apparatus comprises a plurality of spaced apart electrically conductive upper electrodes. A lower electrode layer of the touch sensitive apparatus comprises a plurality of spaced apart electrically conductive lower electrodes. Each upper and lower electrode comprises alternating diamond shaped sensing portions and rectangular shaped connecting portions. The upper and lower electrodes define an electrode matrix having rectangular shaped nodes where the connecting portions of the upper and lower electrodes cross over. When viewed from a top plan view, a region exists at each vertex of each rectangular shaped node that does not include a conductive portion therein, the region has an area in a range from about 0.001 mm² to about 0.01 mm².

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Capacitive touch sensors typically use transparent conductive materials to form the touch sensor electrodes. Depending on the optical properties of the conductive material used for touch sensor electrodes, the electrode pattern, e.g., electrode rows and columns, can be visible in the finished touch sensor. Embodiments disclosed herein involve approaches that reduce the visibility of the electrode pattern.

Figure 1:
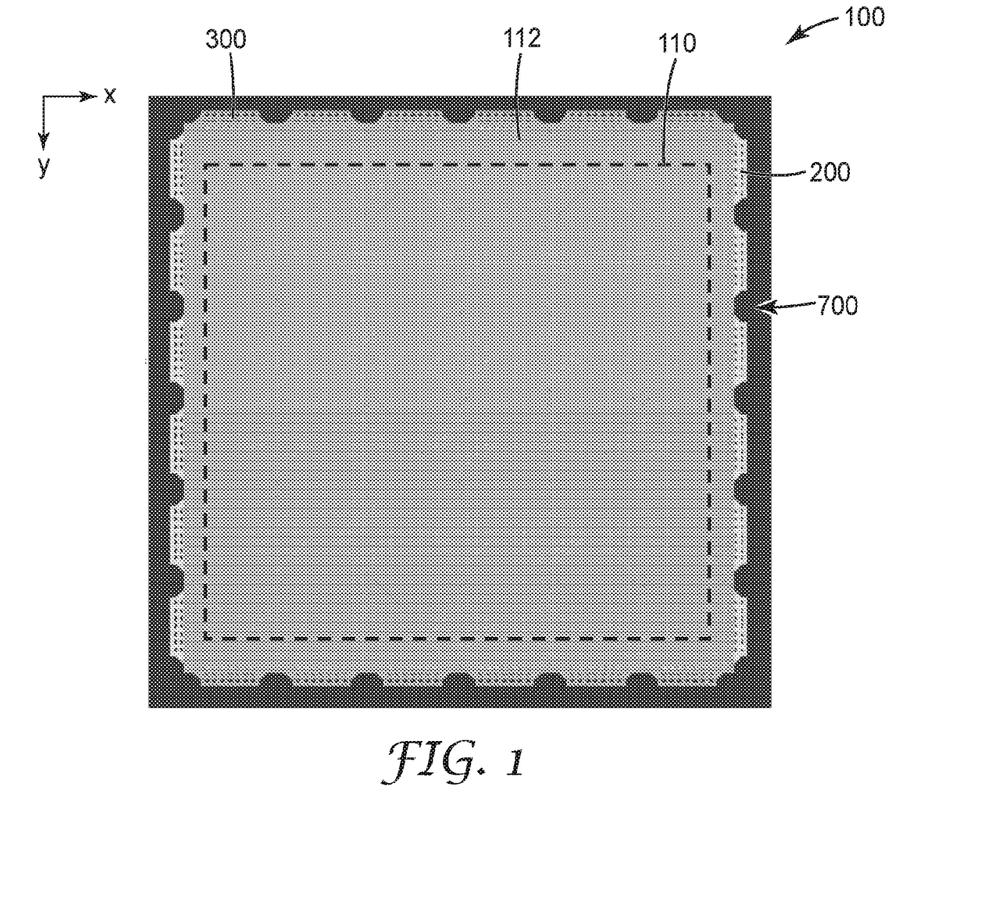
FIG. 1 shows a top plan view of a capacitive touch sensitive apparatus in accordance with some embodiments.

FIG. 1 depicts a top plan view of a capacitive touch sensitive apparatus 100 having a touch sensitive viewing area 110. In some implementations, a display (not shown in FIG. 1) may be arranged so that the display is viewable through the touch sensitive viewing area 110.

The touch sensitive apparatus 100 includes plurality of spaced apart electrically conductive first electrodes 200 disposed in the touch sensitive viewing area 110 and extending along a first direction x. A plurality of spaced apart electrically conductive second electrodes 300 are disposed in the touch sensitive viewing area 110 and extend along a second direction y that is different from the first direction x.

Figure 2:
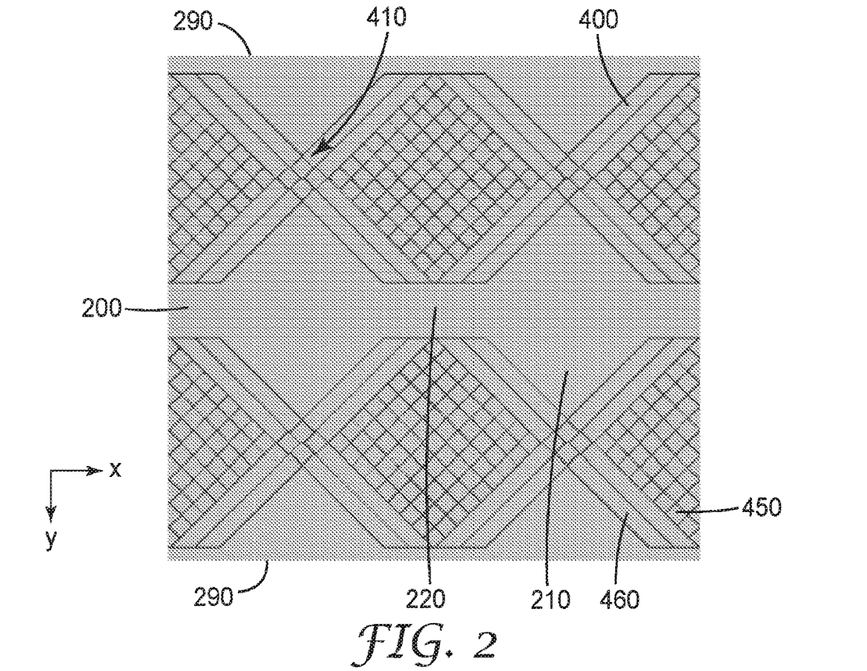
FIG. 2 illustrates a top plan view of a lower electrode layer of a touch sensitive apparatus in accordance with some embodiments.
Figure 3:
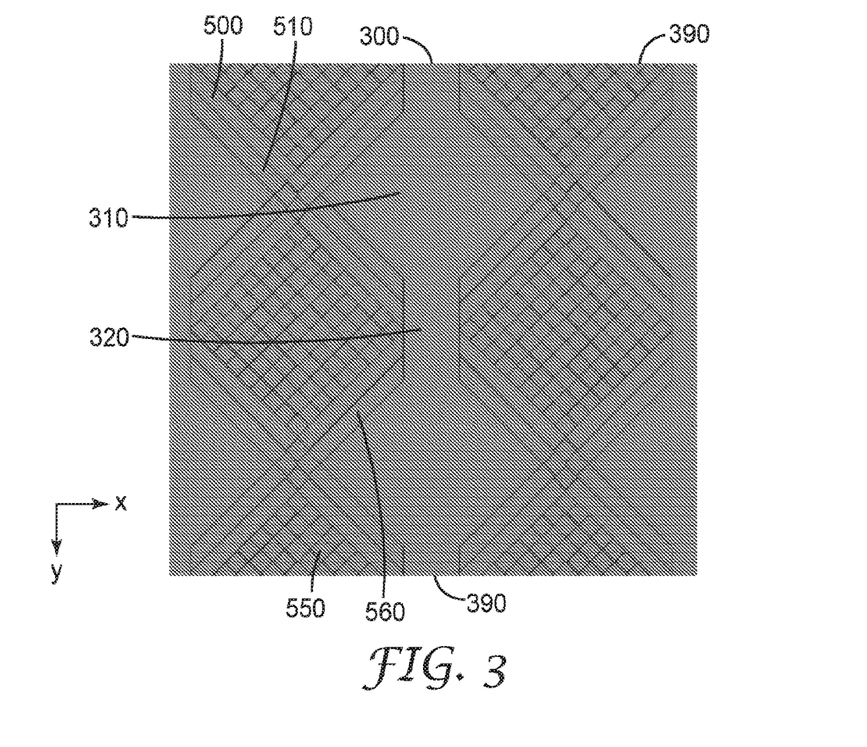
FIG. 3 illustrates a top plan view of an upper electrode layer of the touch sensitive apparatus in accordance with some embodiments.

FIG. 2 shows a top plan view of a lower electrode layer 290 that includes the first electrodes 200. FIG. 3 shows a top plan view of an upper electrode layer 390 that includes the second electrodes 300. In some embodiments, each first electrode 200 comprises a plurality of alternating wider sensing portions 210 and narrower connecting portions 220. Each second electrode 300 comprises a plurality of alternating wider sensing portions 310 and narrower connecting portions 320. Each wider sensing portion 210, 310 may be diamond shaped and each narrower connecting portion 220, 320 may be rectangular shaped, as shown in FIGS. 2 and 3.

A plurality of electrically isolated electrically conductive first polygonal islands 400 is disposed between each pair of adjacent first electrodes 200, as indicated in FIG. 2. Each first polygonal island 400 is electrically isolated from all other first polygonal islands. A plurality of electrically isolated electrically conductive second polygonal islands 500 are disposed between each pair of adjacent second electrodes 300 as depicted in FIG. 3. Each second polygonal island 500 is electrically isolated from all other second polygonal islands. The polygonal islands 400, 500 can be formed by the removal of conductive material to create the electrically isolated islands. The polygonal islands 400, 500 reduce the optical haze of the touch sensor.

According to some embodiments, each first polygonal island 400 is electrically isolated from all other first polygonal islands, all second polygonal islands 500, all first electrodes 200, and all second electrodes 300. Each second polygonal island 500 is electrically isolated from all other second polygonal islands, all first polygonal islands 400, all first electrodes 200, and all second electrodes 300. In some configurations, at least one first polygonal island 450 and at least one second polygonal island 550 are substantially square shaped, and at least one first polygonal island 460 and at least one second polygonal island 560 are substantially trapezoid shaped.

Figure 4:
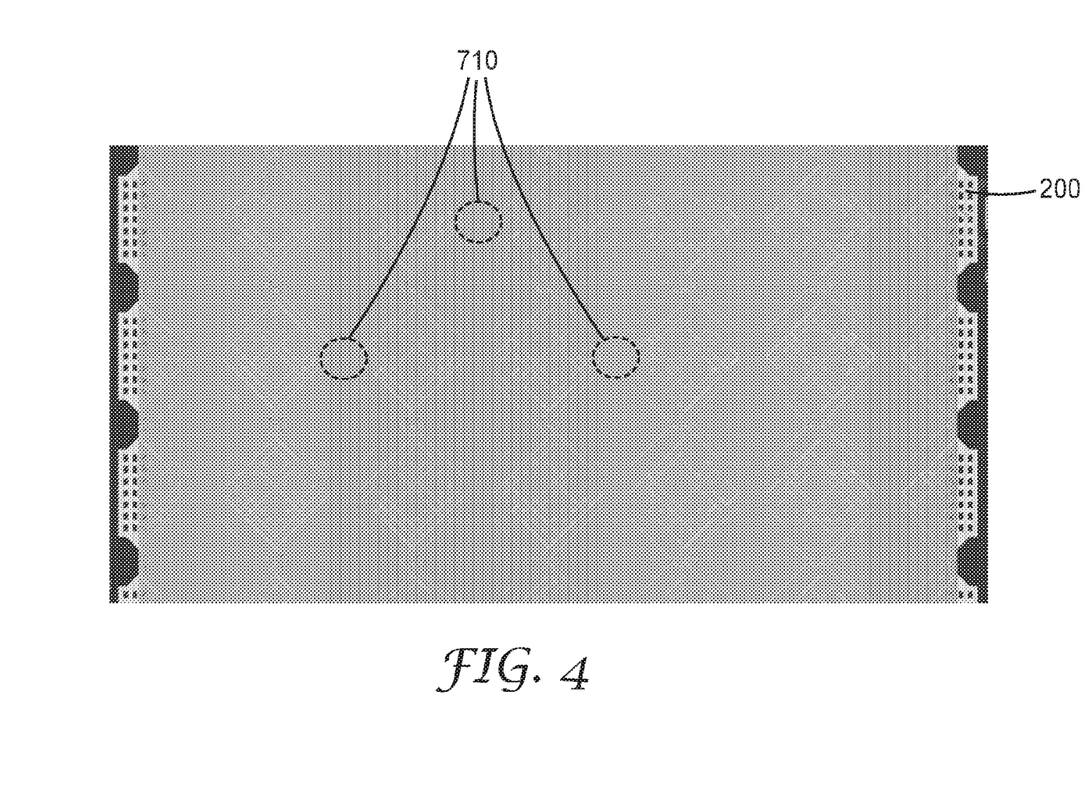
FIGS. 4 and 5 shows stacked lower and upper electrode layers in accordance with some embodiments.

As best seen in FIG. 4, when viewed from a top plan view and except for a plurality of discrete spaced part open regions 600, the touch sensitive viewing area 110 is covered by at least one of a first electrode 200, a second electrode 300, a first polygonal island 400, and a second polygonal island 500. Each open region 600 is disposed at a vertex 410, 510 of at least one of the first 400 and second 500 polygonal islands. The plurality of discrete spaced part open regions 600 form a repeating pattern along the first, x, and second, y, directions.

Figure 5:
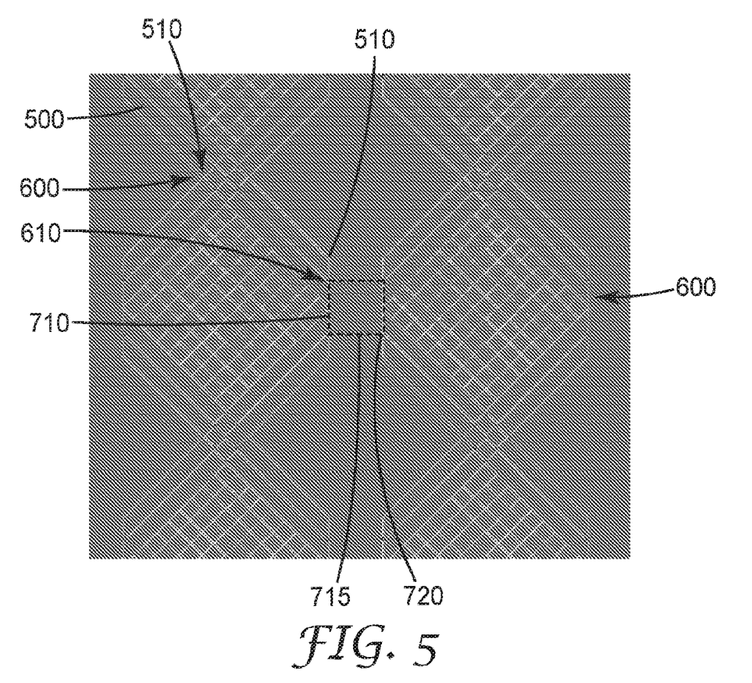

The pluralities of electrically conductive first 200 and second 300 electrodes define an electrode matrix 700 as indicated in FIG. 1. As shown in FIGS. 4 and 5, each first electrode 200 is capacitively coupled to each second electrode 300 at an overlap region 710 of the electrode matrix. As shown in FIGS. 4 and 5, the overlap regions 710 can be substantially rectangular in some embodiments. Some of the open regions 610 in the plurality of open regions 600 may be located on a perimeter 715 of each overlap region 710. In some embodiments, an open region 610 in the plurality of open regions 600 may be disposed at each vertex 720 of the overlap region 710.

Figure 6:
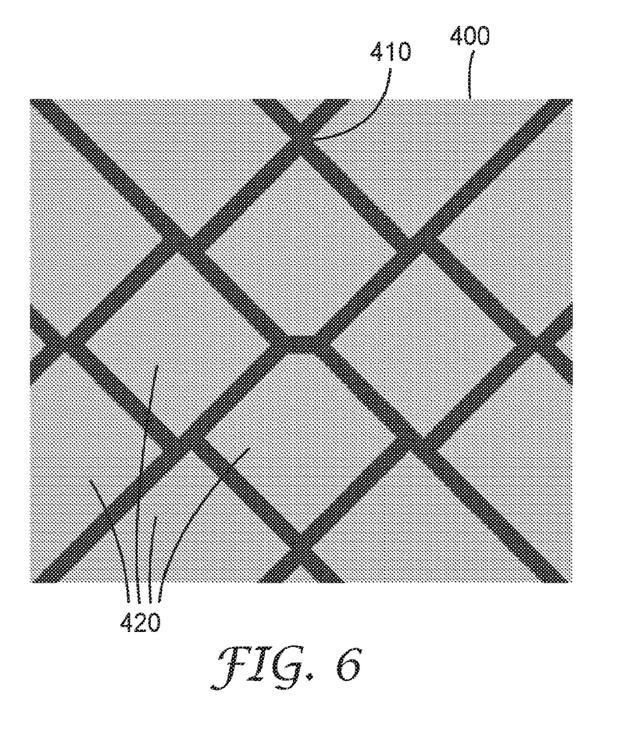
FIG. 6 shows a top plan view of the first polygonal islands of the lower electrode layer in accordance with some embodiments.
Figure 7:
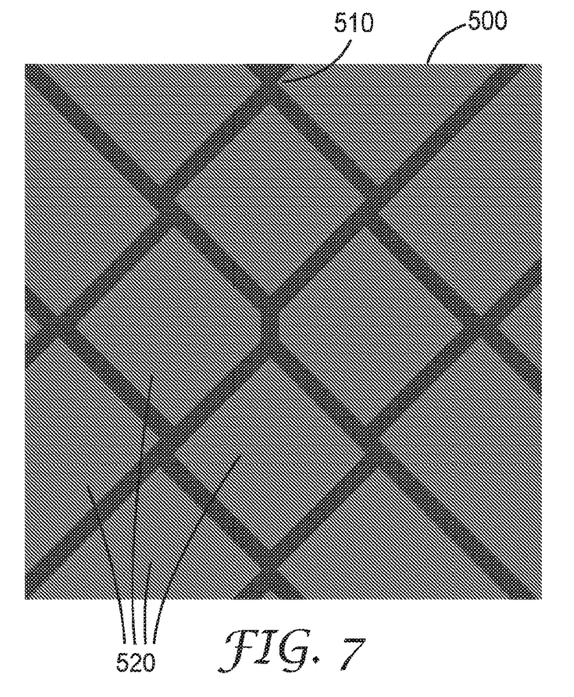
FIG. 7 shows a top plan view of the second polygonal islands of the upper electrode layer in accordance with some embodiments.
Figure 8:
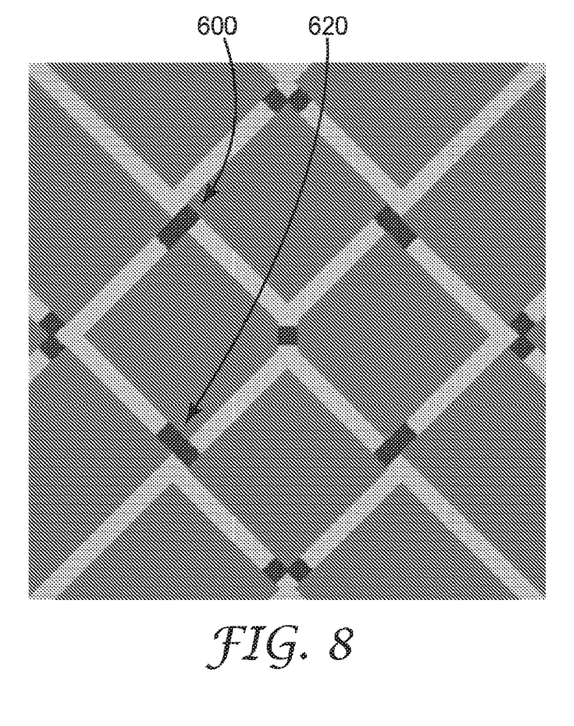
FIG. 8 shows a top plan view of the stacked lower and upper electrode layers of FIGS. 6 and 7.

FIGS. 6 and 7 respectively show the first polygonal islands 400 of the lower electrode layer 290 and the second polygonal islands 500 of the upper electrode layer 390 in more detail. FIG. 8 shows a plan view of the stacked lower and upper electrode layers 290, 390 including open regions 600. According to some embodiments, as depicted in FIG. 8, each open region 620 in the plurality of discrete spaced part open regions is defined by at least two adjacent first islands 420 (see FIG. 4) and two adjacent second islands 520 (see FIG. 7). In some embodiments, each or at least some open regions 620 in the plurality of discrete spaced part open regions are defined by at least three adjacent first islands 420 and three adjacent second islands 520. In some embodiments, each or at least some open regions 620 in the plurality of discrete spaced part open regions are defined by four adjacent first islands 420 and four adjacent second islands 520.

Figure 9:
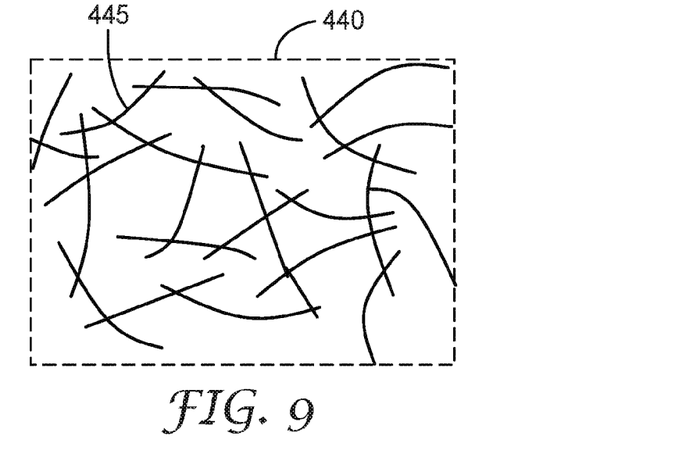
FIG. 9 illustrates a metal mesh used to form electrodes and/or polygonal islands in accordance with some embodiments.

In some embodiments, some or all of the electrodes 200, 300 and/or some or all polygonal islands 400, 500 may comprise a metal mesh or an interconnected network of wires. For example, one or more of the first electrodes 200, second electrodes 300, first polygonal islands 400, and/or second polygonal islands 500 may comprise a metal mesh. FIG. 9 illustrates a metal mesh 435 used to form a first polygonal island 430 in accordance with some embodiments.

Figure 10:
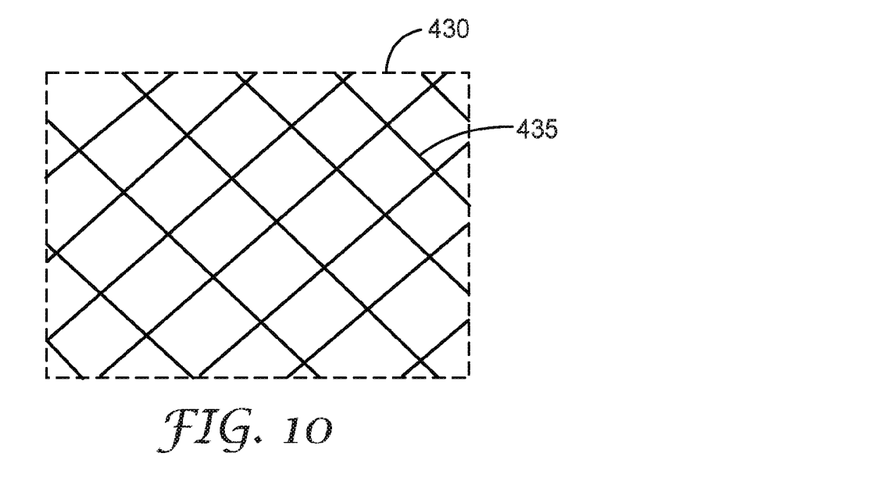
FIG. 10 illustrates an interconnected network of electrically conductive nanowires used to form electrodes and/or polygonal islands in accordance with some embodiments.

In some embodiments, some or all of the first electrodes 200, second electrodes 300, first polygonal islands 400, and/or second polygonal islands 500 comprise an interconnected network of electrically conductive nanowires. FIG. 10 illustrates an interconnected network of electrically conductive nanowires 445 used to form a first polygonal island 440 in accordance with some embodiments.

Figure 11:
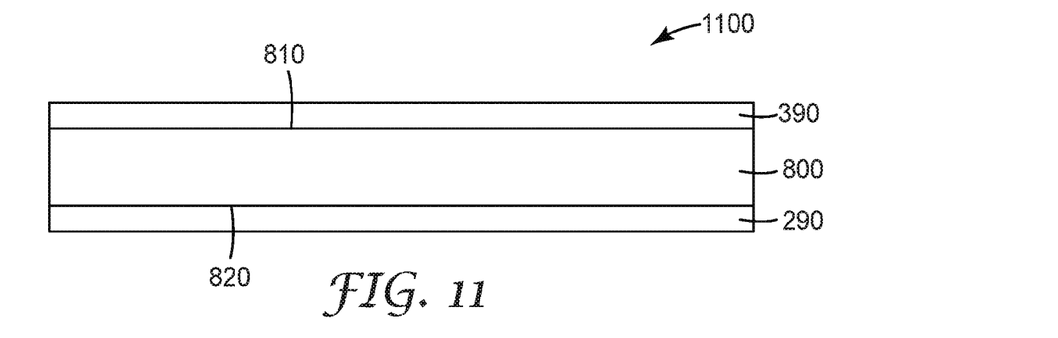
FIG. 11 is a cross sectional diagram illustrating a capacitive touch sensitive apparatus in accordance with some embodiments.

FIG. 11 is a cross sectional diagram illustrating a capacitive touch sensitive apparatus 1100 in accordance with some embodiments. The capacitive touch sensitive apparatus includes an upper electrode layer 390 and a lower electrode layer 290. According to some embodiments, the upper 390 and lower 290 electrodes are formed on opposite major surfaces 810, 820 of the same substrate 800.

The upper electrode layer comprises a plurality of spaced apart electrically conductive upper electrodes 300 as illustrated in FIG. 3, for example. The lower electrode layer 290 comprises a plurality of spaced apart electrically conductive lower electrodes 200 as illustrated in FIG. 2, for example. In some configurations, one or both of the upper electrodes 300 and the lower electrodes 200 includes alternating diamond shaped sensing portions 310, 210 and rectangular shaped connecting portions 320, 220, as best seen in FIGS. 2 and 3. The upper 300 and lower 200 electrodes define an electrode matrix 700 as shown in the plan view of FIG. 1 having rectangular shaped nodes 710 (see FIG. 5). Connecting portions of the upper 300 and lower 200 electrodes cross over each other, such that when viewed from a top plan view, a region 610 exists at each vertex 720 of each rectangular shaped node 710 that does not include a conductive portion therein. The region may have an area in a range from about 0.001 mm$^2$ to about 0.01 mm$^2$, or from about 0.002 mm$^2$ to about 0.009 mm$^2$, or from about 0.003 mm$^2$ to about 0.008 mm$^2$, or from about 0.004 mm$^2$ to about 0.008 mm$^2$.

Embodiments disclosed herein include:

Embodiment 1. A capacitive touch sensitive apparatus, comprising:

a touch sensitive viewing area;

a plurality of spaced apart electrically conductive first electrodes disposed in the touch sensitive viewing area and extending along a first direction;

a plurality of spaced apart electrically conductive second electrodes disposed in the touch sensitive viewing area and extending along a different second direction;

a plurality of electrically isolated electrically conductive first polygonal islands disposed between each pair of adjacent first electrodes; and a plurality of electrically isolated electrically conductive second polygonal islands disposed between each pair of adjacent second electrodes, such that, when viewed from a top plan view and except for a plurality of discrete spaced part open regions, the touch sensitive viewing area is covered by at least one of a first electrode, a second electrode, a first island, and a second island, each open region being at a vertex of at least one of the first and second polygonal islands.

Embodiment 2. The capacitive touch sensitive apparatus of embodiment 1, wherein the pluralities of electrically conductive first and second electrodes define an electrode matrix, each first electrode capacitively coupled to each second electrode at an overlap region of the electrode matrix, wherein some of the open regions in the plurality of open regions are located on a perimeter of each overlap region.

Embodiment 3. The capacitive touch sensitive apparatus of embodiment 2, wherein each overlap region is rectangular, and an open region in the plurality of open regions is disposed at each vertex of the rectangular overlap region.

Embodiment 4. The capacitive touch sensitive apparatus of any of embodiments 1 through 3, wherein the plurality of discrete spaced part open regions form a repeating pattern along the first and second directions.

Embodiment 5. The capacitive touch sensitive apparatus of any of embodiments 1 through 4, wherein each open region in the plurality of discrete spaced part open regions is defined by at least two adjacent first islands and two adjacent second islands.

Embodiment 6. The capacitive touch sensitive apparatus of any of embodiments 1 through 4, wherein each of some open regions in the plurality of discrete spaced part open regions is defined by at least three adjacent first islands and three adjacent second islands.

Embodiment 7. The capacitive touch sensitive apparatus of any of embodiments 1 through 4, wherein each of some open regions in the plurality of discrete spaced part open regions is defined by four adjacent first islands and four adjacent second islands.

Embodiment 8. The capacitive touch sensitive apparatus of any of embodiments 1 through 7, wherein each first and second electrode comprises a plurality of alternating wider sensing portions and narrower connecting portions.

Embodiment 9. The capacitive touch sensitive apparatus of embodiment 8, wherein each wider sensing portion is diamond shaped and each narrower connecting portion is rectangular shaped.

Embodiment 10. The capacitive touch sensitive apparatus of any of embodiments 1 through 9, wherein each first electrode, second electrode, first island, and second island comprises a metal mesh.

Embodiment 11. The capacitive touch sensitive apparatus of any of embodiments 1 through 9, wherein each first electrode, second electrode, first island, and second island comprises an interconnected network of electrically conductive nanowires.

Embodiment 12. The capacitive touch sensitive apparatus of any of embodiments 1 through 11, wherein each first polygonal island is electrically isolated from all other first polygonal islands, all second polygonal islands, all first electrodes, and all second electrodes.

Embodiment 13. The capacitive touch sensitive apparatus of any of embodiments 1 through 12, wherein each second polygonal island is electrically isolated from all other second polygonal islands, all first polygonal islands, all first electrodes and all second electrodes.

Embodiment 14. The capacitive touch sensitive apparatus of any of embodiments 1 through 13, wherein at least one first polygonal island and at least one second polygonal island are substantially square shaped, and at least one first polygonal island and at least one second polygonal island are substantially trapezoid shaped.

Embodiment 15. A capacitive touch sensitive apparatus, comprising:

an upper electrode layer comprising a plurality of spaced apart electrically conductive upper electrodes;

a lower electrode layer comprising a plurality of spaced apart electrically conductive lower electrodes, each upper and lower electrode comprising alternating diamond shaped sensing portions and rectangular shaped connecting portions, the upper and lower electrodes defining an electrode matrix having rectangular shaped nodes where the connecting portions of the upper and lower electrodes cross over, such that when viewed from a top plan view, a region exists at each vertex of each rectangular shaped node that does not include a conductive portion therein, the region having an area in a range from about 0.001 mm$^2$ to about 0.01 mm$^2$.

Embodiment 16. The capacitive touch sensitive apparatus of embodiment 15, wherein the region has an area in a range from about 0.002 mm$^2$ to about 0.009 mm$^2$.

Embodiment 17. The capacitive touch sensitive apparatus of embodiment 15, wherein the region has an area in a range from about 0.003 mm$^2$ to about 0.008 mm$^2$.

Embodiment 18. The capacitive touch sensitive apparatus of embodiment 15, wherein the region has an area in a range from about 0.004 mm$^2$ to about 0.008 mm$^2$.

Embodiment 19. The capacitive touch sensitive apparatus of embodiment 15, wherein the upper and lower electrodes are formed on opposite major surfaces of a same substrate.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of this invention will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A capacitive touch sensitive apparatus, comprising:
   a touch sensitive viewing area;
   a plurality of spaced apart electrically conductive first electrodes disposed in the touch sensitive viewing area and extending along a first direction;
   a plurality of spaced apart electrically conductive second electrodes disposed in the touch sensitive viewing area and extending along a different second direction;
   a plurality of electrically isolated electrically conductive first polygonal islands disposed between each pair of adjacent first electrodes; and
   a plurality of electrically isolated electrically conductive second polygonal islands different from the plurality of electrically isolated electrically conductive first polygonal islands disposed between each pair of adjacent second electrodes, such that, when viewed from a top plan view and except for a plurality of discrete spaced part open regions, the touch sensitive viewing area is covered by at least one of a first electrode, a second electrode, a first island of the plurality of electrically isolated electrically conductive first polygonal islands, and a second island of the plurality of electrically isolated electrically conductive second polygonal islands, each open region being at a vertex of at least one of the first and second polygonal islands.

2. The capacitive touch sensitive apparatus of claim 1, wherein the pluralities of electrically conductive first and second electrodes define an electrode matrix, each first electrode capacitively coupled to each second electrode at an overlap region of the electrode matrix, wherein some of the open regions in the plurality of open regions are located on a perimeter of each overlap region.

3. The capacitive touch sensitive apparatus of claim 1, wherein the plurality of discrete spaced part open regions form a repeating pattern along the first and second directions.

4. The capacitive touch sensitive apparatus of claim 1, wherein each of some open regions in the plurality of discrete spaced part open regions is defined by at least three adjacent first islands and three adjacent second islands.

5. The capacitive touch sensitive apparatus of claim 1, wherein each first electrode, second electrode, first island, and second island comprises a metal mesh.

6. The capacitive touch sensitive apparatus of claim 1, wherein each first electrode, second electrode, first island, and second island comprises an interconnected network of electrically conductive nanowires.

7. The capacitive touch sensitive apparatus of claim 1, wherein each first polygonal island is electrically isolated from all other first polygonal islands, all second polygonal islands, all first electrodes and all second electrodes, and each second polygonal island is electrically isolated from all other second polygonal islands, all first polygonal islands, all first electrodes and all second electrodes.

8. The capacitive touch sensitive apparatus of claim 1, wherein at least one first polygonal island and at least one second polygonal island are substantially square shaped, and at least one first polygonal island and at least one second polygonal island are substantially trapezoid shaped.

9. A capacitive touch sensitive apparatus, comprising:
an upper electrode layer comprising a plurality of spaced apart electrically conductive upper electrodes, each upper electrode of the plurality of spaced apart electrically conductive upper electrodes separated from at least one other upper electrode by a plurality of electrically isolated electrically conductive first polygonal islands;
a lower electrode layer comprising a plurality of spaced apart electrically conductive lower electrodes, each lower electrode of the plurality of spaced apart electrically conductive lower electrodes separated from at least one other lower electrode by a plurality of electrically isolated electrically conductive second polygonal islands, each upper and lower electrode comprising alternating diamond shaped sensing portions and rectangular shaped connecting portions, the upper and lower electrodes defining an electrode matrix having rectangular shaped nodes where the connecting portions of the upper and lower electrodes cross over, such that when viewed from a top plan view, a region exists at each vertex of each rectangular shaped node that does not include a conductive portion therein, the region having an area in a range from about 0.001 $mm^2$ to about 0.01 $mm^2$.

10. The capacitive touch sensitive apparatus of claim 9, wherein the upper and lower electrodes are formed on opposite major surfaces of a same substrate.

\* \* \* \* \*